(12) United States Patent
Arnold et al.

(10) Patent No.: US 7,521,140 B2
(45) Date of Patent: Apr. 21, 2009

(54) FUEL CELL SYSTEM WITH ELECTROKINETIC PUMP

(75) Inventors: Don W. Arnold, Livermore, CA (US); Phillip H. Paul, Livermore, CA (US); Deon S. Anex, Livermore, CA (US)

(73) Assignee: Eksigent Technologies, LLC, Dubin, CA (US)

( * ) Notice: Subject to any disclaimer, the term of this patent is extended or adjusted under 35 U.S.C. 154(b) by 563 days.

(21) Appl. No.: 10/827,788

(22) Filed: Apr. 19, 2004

(65) Prior Publication Data
US 2005/0233195 A1  Oct. 20, 2005

(51) Int. Cl.
*H01M 8/02* (2006.01)
*H01M 8/04* (2006.01)

(52) U.S. Cl. .............................. 429/17; 429/22; 429/34

(58) Field of Classification Search .................. 429/12, 429/17, 22–24, 30, 34
See application file for complete search history.

(56) References Cited

U.S. PATENT DOCUMENTS

| | | | | |
|---|---|---|---|---|
| 2,615,940 A | 10/1952 | Williams | ...................... | 171/330 |
| 2,644,900 A | 7/1953 | Hardway, Jr. | ................... | 310/2 |
| 2,644,902 A | 7/1953 | Hardway, Jr. | ................... | 310/2 |
| 2,661,430 A | 12/1953 | Hardway, Jr. | ................... | 310/2 |
| 2,995,714 A | 8/1961 | Hannah | ....................... | 331/107 |
| 3,143,691 A | 8/1964 | Hurd | ............................ | 317/231 |
| 3,209,255 A | 9/1965 | Estes et al. | ...................... | 324/94 |
| 3,427,978 A | 2/1969 | Hanneman et al. | .............. | 103/1 |
| 3,544,237 A | 12/1970 | Walz | ............................ | 417/48 |
| 3,682,239 A | 8/1972 | Abu-Romia | .................. | 165/1 |
| 3,923,426 A | 12/1975 | Theeuwes | .................... | 417/48 |
| 4,639,244 A * | 1/1987 | Rizk et al. | ..................... | 604/19 |
| 4,921,041 A | 5/1990 | Akachi | ................... | 165/104.29 |
| 5,219,020 A | 6/1993 | Akachi | ................... | 165/104.26 |
| 5,418,079 A | 5/1995 | Diethelm | ...................... | 429/26 |
| 5,573,651 A | 11/1996 | Dasgupta et al. | ............. | 204/601 |
| 5,858,193 A | 1/1999 | Zanzucchi et al. | ........... | 204/601 |
| 5,862,035 A * | 1/1999 | Farahmandi et al. | ......... | 361/502 |
| 5,942,093 A | 8/1999 | Rakestraw et al. | ........... | 204/450 |

(Continued)

FOREIGN PATENT DOCUMENTS

CN  2286429 Y  7/1998

(Continued)

OTHER PUBLICATIONS

Zeng, S. et al., "Fabrication and characterization of electroosmotic micropumps," *Sensors and Actuators*, B 79:107-114 (2001).

(Continued)

*Primary Examiner*—Gregg Cantelmo
(74) *Attorney, Agent, or Firm*—Marc Karish; Sheldon Mak Rose & Anderson

(57) ABSTRACT

A fuel cell system having a fuel cell, the fuel cell having a membrane-electrode assembly; a fuel reservoir containing a liquid fuel; a conduit coupling the fuel reservoir to the fuel cell; and an electrokinetic fuel pump coupled to the conduit, the electrokinetic fuel pump having a plurality of electrodes; wherein the electrokinetic fuel pump moves fuel from the fuel reservoir through the conduit to the fuel cell; and wherein the electrokinetic fuel pump electrodes do not deleteriously affect the performance of the membrane-electrode assembly.

20 Claims, 9 Drawing Sheets

U.S. PATENT DOCUMENTS

| | | | |
|---|---|---|---|
| 5,961,800 A | 10/1999 | McBride et al. | 204/450 |
| 6,012,902 A | 1/2000 | Parce | 417/48 |
| 6,013,164 A | 1/2000 | Paul et al. | 204/450 |
| 6,019,882 A | 2/2000 | Paul et al. | 204/450 |
| 6,045,933 A | 4/2000 | Okamoto | 429/17 |
| 6,068,243 A | 5/2000 | Hoggan | 256/34 |
| 6,068,767 A | 5/2000 | Garguilo et al. | 210/198.2 |
| 6,086,243 A | 7/2000 | Paul et al. | 366/273 |
| 6,106,685 A | 8/2000 | McBride et al. | 204/600 |
| 6,224,728 B1 | 5/2001 | Oborny et al. | 204/450 |
| 6,255,551 B1 | 7/2001 | Shapiro et al. | 588/204 |
| 6,277,257 B1 | 8/2001 | Paul et al. | 204/450 |
| 6,287,440 B1 | 9/2001 | Arnold et al. | 204/450 |
| 6,290,909 B1 | 9/2001 | Paul et al. | 422/70 |
| 6,379,402 B1 * | 4/2002 | Suhara et al. | 29/25.03 |
| 6,406,605 B1 | 6/2002 | Moles | 204/601 |
| 6,409,698 B1 * | 6/2002 | Robinson et al. | 604/19 |
| 6,460,420 B1 | 10/2002 | Paul et al. | 73/861.52 |
| 6,477,410 B1 | 11/2002 | Henley et al. | 604/20 |
| 6,719,535 B2 | 4/2004 | Rakestraw et al. | 417/50 |
| 6,733,244 B1 * | 5/2004 | Fritsch et al. | 417/48 |
| 6,878,473 B2 * | 4/2005 | Yamauchi et al. | 429/17 |
| 7,147,955 B2 * | 12/2006 | Adams | 429/34 |
| 2001/0008212 A1 | 7/2001 | Shepodd et al. | 204/451 |
| 2002/0070116 A1 | 6/2002 | Ohkawa | 204/603 |
| 2002/0076598 A1 | 6/2002 | Bostaph et al. | 429/38 |
| 2002/0125134 A1 | 9/2002 | Santiago et al. | 204/450 |
| 2003/0138678 A1 | 7/2003 | Preidel | 429/31 |
| 2003/0190514 A1 | 10/2003 | Okada et al. | 429/31 |
| 2003/0215686 A1 | 11/2003 | DeFilippis et al. | 429/34 |
| 2004/0011648 A1 | 1/2004 | Paul et al. | 204/450 |

FOREIGN PATENT DOCUMENTS

| | | |
|---|---|---|
| JP | 09270265 A * | 10/1997 |
| WO | WO 96/39252 | 12/1996 |
| WO | WO 99/16162 | 4/1999 |
| WO | WO 00/04832 | 3/2000 |
| WO | WO 02/068821 | 9/2002 |
| WO | WO 2004/007080 | 1/2004 |

OTHER PUBLICATIONS

International Search Report for PCT/US05/12762 dated Aug. 18, 2005.

Adamson A.W. et al., *Physical Chemistry of Surfaces*, pp. 185-187 (Wiley, NY 1997).
Ananthakrishnan, V. et al., *A.I. Ch.E. Journal*, 11(6):1063-1072 (Nov. 1965).
Aris, R., *Oxidation of organic sulphides. VI*, Proc. Roy. Soc. (London), 235A:67-77.
Burgreen, D. et al., *The Journal of Physical Chemistry*, 68(95):1084-1091 (May 1964).
Chatwin, P.C. et al., *J. Fluid Mech.*, 120:347-358 (1982).
Doshl, M.R. et al., *Chemical Engineering Science*, 33:795-804 (1978).
Drott, J. et al., *J. Micromech. Microeng.* 7:14-23 (1997).
Gan, W. et al. *Talanta* 51:667-675 (2000).
Jessensky O. et al., *J. Electrochem. Soc.* 145(11):3735-3740 (Nov. 1998).
Johnson, D.L. et al., *Physical Review Letters*, 37(7):3502-3510 (Mar. 1, 1988).
Johnson, D.L. et al., *Physical Review Letter*, 57(20):2564-2567 (Nov. 17, 1986).
Johnson, D.L. et al., *J. Fluid Mech.* 176:379-402 (1987).
Kobatake, Y. et al., *J. Chem. Phys.* 40(8):2212-2218 (Apr. 1964).
Kobatake, Y. et al., *J. Chem. Phys.* 40(8):2219-2222 (Apr. 1964).
Ma, Y. et al., *Microporous and Mesoporous Materials*, 37:243-252(2000).
Morrison, F.A. et al., *J. Chem. Phys.* 43:2111-2115 (1965).
Nakanishi, K. et al., *Journal of Crystalline Solids*, 139:1-13 (1992).
Paul, P.H. et al., *Micro Total Analysis Systems*, pp. 583-590 (2000).
Paul, P.H. et al., *Micro Total Analysis Systems*, pp. 49-52 (1998).
Peters, E C. et al., *Anal. Chem.* 69:3646-3649 (1997).
Philipse, A.P., *Journal of Materials Science Letters*, 8: 1371-1373 (1989).
Rastogi, R.P., *J. Scient. Ind. Res.*, (28):284-292 (Aug. 1969).
Rice, C.L. et al., *J. Phys. Chem.* 69(11):4017-4024 (Nov. 1965).
Rosen, M.J., *Surfactants and Interacial Phenomena*, Second Ed., John Wiley & Sons, pp. 32-107.
Schmid, G. *J. Membrane Sci.* 150:159-170 (1998).
Schmid, G. et al., *J. Membrane Sci.* 150:197-209 (1998).
Taylor, G., *Prox. Roy. Soc.* (London) 21:186-203.
Weston, A. et al., *HPLC and CE, Principles and Practice*, pp. 82-85, Academic Press.
Wijnhoven, J. et al., *Science*, 281:802-804 (Aug. 7, 1998).
Yzawa, T., *Key Engineering Materials*, 115: 125-146 (1996).
Notification Concerning Transmittal of Copy and International Preliminary Report on Patentability for PCT Application PCT/US2005/012762, dated Oct. 25, 2006, 7 pages.

* cited by examiner

FUEL CELL SYSTEM WITH ELECTROKINETIC PUMP

CROSS-REFERENCE TO RELATED APPLICATIONS

This application is related to International application No. PCT/US03/32895 filed on Oct. 17, 2003, which is a continuation-in-part of U.S. Pat. No. 7,267,753 filed Dec. 17, 2002, which is a continuation-in-part of U.S. Pat. No. 7,235,164, filed Oct. 18, 2002; the entire disclosure of each of these applications is hereby incorporated herein for all purposes.

BACKGROUND

The present invention is directed to fuel cells, and more particularly to a fuel cell system employing at least one electrokinetic pump for moving fuel.

There are many different types of fuel cells currently in operation. Some fuel cells operate using gasses and some operate using liquids. The present invention is directed to liquid fuel cells. There are many varieties of liquid fuel cells, including methanol reacting fuel cells. The popularity of methanol results from the fact that it has a very high proton density. However, many other liquid fuels have been suggested, ranging from formic acid to sugar water. The present invention is applicable to liquid fuel cells in general.

One mode of fuel cell operation is the direct catalytic conversion method. Methanol based fuel cells employing this method are known as DMFC, or direct methanol fuel cells. The methanol is delivered directly to a membrane-electrode assembly ("MEA") with appropriate catalytic materials to extract protons from the fuel directly. The protons are transferred across the membrane to a catalytic electrode where the protons are converted to water by reaction with an oxidant, typically oxygen.

Another mode of fuel cell operation involves thermocatalytic degradation of a liquid fuel to generate hydrogen gas. The hydrogen gas is then sent to a membrane-electrode assembly where the hydrogen catalytically decomposed. The protons pass through the membrane and are oxidized to water on a second catalytic electrode. In both methods, the electrons are transported from one side of a membrane-electrode assembly to the other side of the membrane-electrode assembly through an electrical circuit where the displacement current used to power electrical devices.

One major problem with fuel cells has been the lack of an adequate solution for delivery of liquid fuel. Initially, efforts were made to develop passive delivery systems, such as systems employing capillary forces, diffusion, etc., but these delivery systems did not provide enough fuel to meet the electricity generation requirements of current demanding applications such as portable electronics. Currently, fuel delivery is often done by a diaphragm pump using a microfabricated diaphragm and check valves and a piezo electric stack for actuation. This type of pump has several drawbacks.

Typically, the pump operates at very high voltages, requiring specialized electronic circuitry for operation. Additionally, existing pumps typically operate in a half-rectified mode having only a 50% duty cycle, thereby leading to pulsation in the delivery of the fuel. Moreover, the volume displacement per cycle is typically very small leading to inefficiency in pumping. To mitigate this problem, pump developers tend to operate the pumps at a very high frequency which removes fine control of the pump, makes the pump subject to reduced performance if bubbles are present, and often generates a buzzing sound. This also hinders the use of the device with a feedback control loop based upon the power output of the cell and/or the power requirements of the device. Therefore, there exists a need for an improved fuel cell pump.

Generally, existing systems simply pump a mixture of fuel from a reservoir through a chamber that contains the membrane-electrode assembly. One problem with this approach is that a significant portion of the fuel traverses the chamber without ever coming into contact with a catalyst in the membrane-electrode assembly. The depletion of the fuel occurs only at the membrane-electrode assembly. Without an active mechanism for transport of the fuel perpendicular to the surface of the membrane-electrode assembly, the only means for fuel to reach the membrane-electrode assembly is diffusion. This translates directly into an inefficiency of the overall fuel delivery system, because liquids are being transported through the system without effective energy conversion.

An additional problem is that fuel is expended as it traverses the length of the chamber, lowering the overall concentration as a function of location along the length of the membrane-electrode assembly. As fuel comes into contact with the membrane-electrode assembly, the fuel is converted into electrical current. With only diffusion to replenish fuel in the boundary layer of the flow, a gradient concentration distribution is established across the face of the membrane-electrode assembly, making the performance in some regions of the cell less efficient than others. There is therefore a need for improved fuel delivery within the fuel cell.

SUMMARY

Accordingly, the present invention is directed to a fuel cell system comprising a fuel cell having a membrane-electrode assembly; a fuel reservoir containing a liquid fuel; a conduit coupling the fuel reservoir to the fuel cell; and an electrokinetic fuel pump coupled to the conduit, the electrokinetic pump comprising a plurality of electrodes. The electrokinetic fuel pump moves fuel from the fuel reservoir through the conduit to the fuel cell. The electrokinetic fuel pump electrodes do not deleteriously affect the performance of the membrane-electrode assembly. The electrokinetic fuel pump electrodes can comprise capacitative carbon electrodes.

The fuel cell system can also have a mixing chamber coupled to the conduit and a high temperature fuel reformer. Optionally, the fuel cell system has a mixing chamber and an electrokinetic mixing pump coupled to the conduit. The electrokinetic mixing pump can be an oscillatory pump and can have a plurality of check valves.

Optionally, the fuel cell system has a plurality of electrokinetic stirring pumps positioned inside of the fuel cell for stirring the fuel in the fuel cell. Optionally, the fuel cell system has a current monitor for monitoring the current produced by the fuel cell. Optionally, the fuel cell system has a temperature sensor for sensing the temperature of the fuel cell. A controller can control the flow rate of the electrokinetic fuel pump and/or the electrokinetic stirring pumps based upon the current detected by the current monitor and/or the temperature sensed by the temperature sensor.

The fuel cell system can also have an electrokinetic recirculation pump for pumping reaction products generated at a cathode of the membrane-electrode assembly to an anode of the membrane-electrode assembly. Optionally, the fuel cell system has a concentration sensor coupled to a controller that controls the flow rate of the electrokinetic recirculation pump based on a concentration sensed by the concentration sensor.

Optionally, a plurality of heat conducting posts or heat conducting fins are positioned inside of the fuel cell. Optionally, the fuel cell system has a plurality of heat conducting fins in thermal contact with an outer surface of the fuel cell.

The fuel cell can be formed as a cylinder having a center channel with fuel being delivered to the fuel cell along the center channel. Alternatively, the fuel cell can be formed as a cylinder having an outer circumferential channel with fuel delivered to the fuel cell along the outer circumferential channel.

The present invention is also directed to a method for generating electricity comprising pumping fuel from a fuel reservoir into a fuel cell with an electrokinetic fuel pump; and passing the fuel through a membrane-electrode assembly in the fuel cell to generate an electric current. Optionally, the current produced by the fuel cell is monitored and the rate of pumping fuel from the fuel reservoir is controlled based upon the current produced by the fuel cell. Optionally, the fuel in the fuel cell is stirred with a plurality of stirring electrokinetic pumps. Optionally, reaction products generated at a cathode of the membrane-electrode assembly are pumped to an anode of the membrane-electrode assembly by an electrokinetic recirculation pump.

THE DRAWINGS

A better understanding of the present invention will be had with reference to the accompanying drawings in which.

DESCRIPTION

Figure 1:
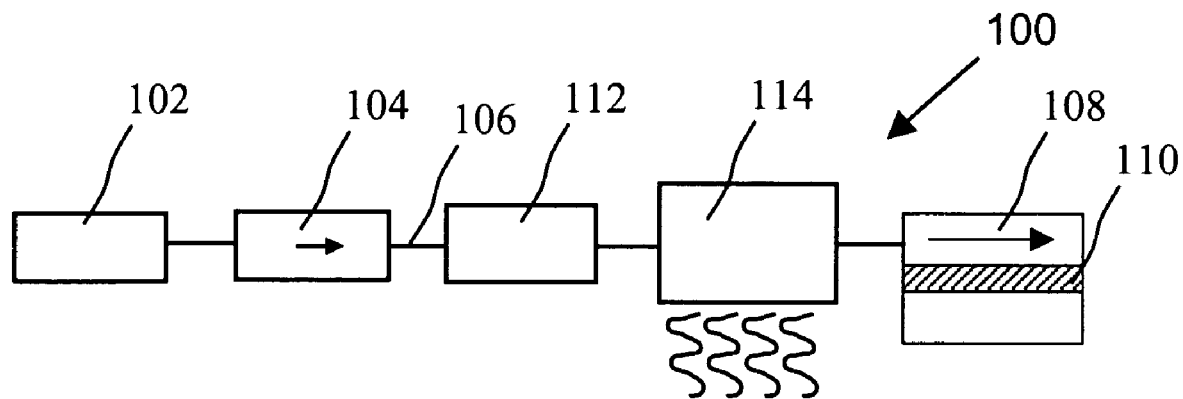
FIG. 1 is a schematic diagram of a fuel cell system according to a first embodiment of the present invention.

An overview of a fuel system 100 according to a first embodiment of the present invention is shown in FIG. 1. Fuel is pumped from a fuel reservoir 102 by an electrokinetic fuel pump 104 through a conduit 106 to a fuel cell 108. The fuel cell 108 has a membrane-electrode assembly ("MEA") 110 which converts the fuel into reaction products and electricity.

Optionally, depending on the type of fuel and fuel cell being used in the system, the fuel can be pumped through a mixing chamber 112 prior to being pumped to the fuel cell 108. Optionally, depending on the type of fuel and fuel cell being used in the system, the fuel can also be pumped through a high temperature fuel reformer 114 prior to being pumped into the fuel cell 108. The mixing chamber 112 may be coupled to one or more diluent reservoirs (not shown) and diluents may be pumped to the mixing chamber 112 using one or more additional electrokinetic pumps (not shown).

Figure 2:
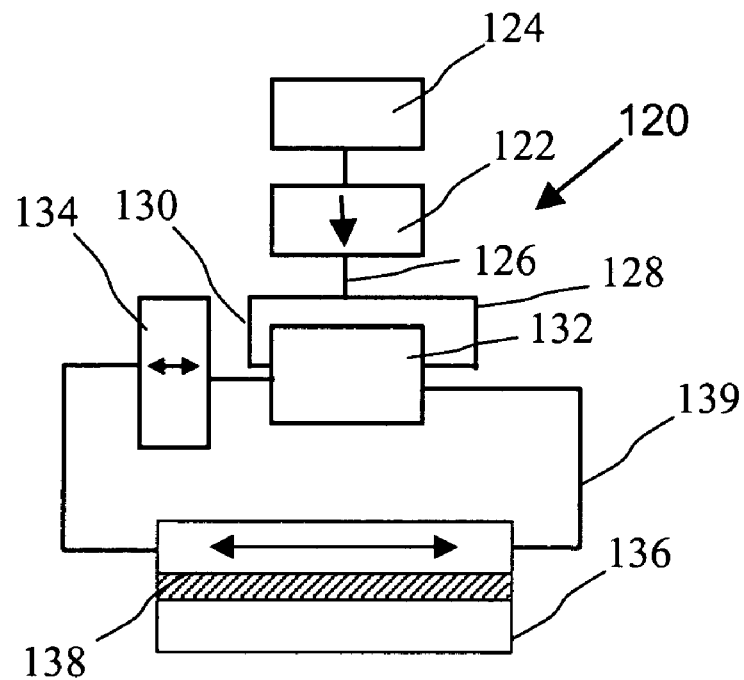
FIG. 2 is a schematic diagram of a fuel cell system according to a second embodiment of the present invention employing two electrokinetic pumps.

FIG. 2 is a schematic diagram of a fuel cell system 120 according to a second embodiment of the present invention employing two electrokinetic pumps. An electrokinetic fuel pump 122 moves fuel from a fuel reservoir 124 through a conduit 126. Optionally, the conduit 126 splits into two segments 128, 130, each segment terminating in an opposite side of a mixing chamber 132. The electrokinetic fuel pump 122 delivers fuel at a rate appropriate for the power generation capability of the fuel cell. About one-half of the flow is delivered to each side of the mixing chamber 132. An electrokinetic mixing pump 134 operates in an oscillatory mode to deliver the fuel mixture from the mixing chamber 132 to a fuel cell 136 having a membrane-electrode assembly 138. Optionally, a return conduit 139 returns unused fuel to the mixing chamber 132.

Typically, the membrane-electrode assembly of a fuel cell contains a catalyst to facilitate conversion of the fuel, proton exchange elements to carry protons from an anode to a cathode, and conductors to carry current generated by the cell. For hydrogen fuel cells, the catalyst is usually platinum on both the anode and cathode. However, the conversion of liquid fuels, such as methanol, usually requires a mixed catalyst at the anode, such as a platinum/ruthenium mixture. The exchange element is most frequently selected from the family of sulfonated perfluorocarbon membranes, such as Nafion by DuPont. The catalyst is typically supported on a porous carbon support, which also acts as the conducting collector plate at the anode and cathode, or on the porous proton exchange membrane.

Currently, the only acceptable micropumps commercially available for use in portable fuel cell systems are piezoelectric actuated diaphragm pumps using microchip valves. The present invention proposes using electrokinetic pumps to move the fuel within the fuel cell system. Prior known electrokinetic pumps are unacceptable in fuel cell systems because of material incompatibility issues. Specifically, prior art electrokinetic pumps use metal electrodes which provide positive metal ions in solution that have detrimental effects on the membrane-electrode assembly. Also, prior art electrokinetic pumps utilize ionic solutions for support of the double layer. The ionic solutions can have a negative effect on the catalytic activity of fuel cell systems. Therefore, a different design, employing specifically selected materials compatible with the catalysts used in a fuel cell must be selected.

The present invention employs electrokinetic pumps to move fuel and reaction products within a fuel cell. The electrokinetic pumps usable in fuel cells include those pumps that use capacitive carbon electrodes to provide the electron to ion conversion in the current loop that serves to provide flow through the pump. Electrokinetic pumps are small, silent, low-power consumption devices suitable for providing a sufficient quantity of fuel to a fuel cell. Moreover, electrokinetic pumps operate on low-voltage that can be provided by normally existing power circuitry in any electronics device.

Figure 3A:
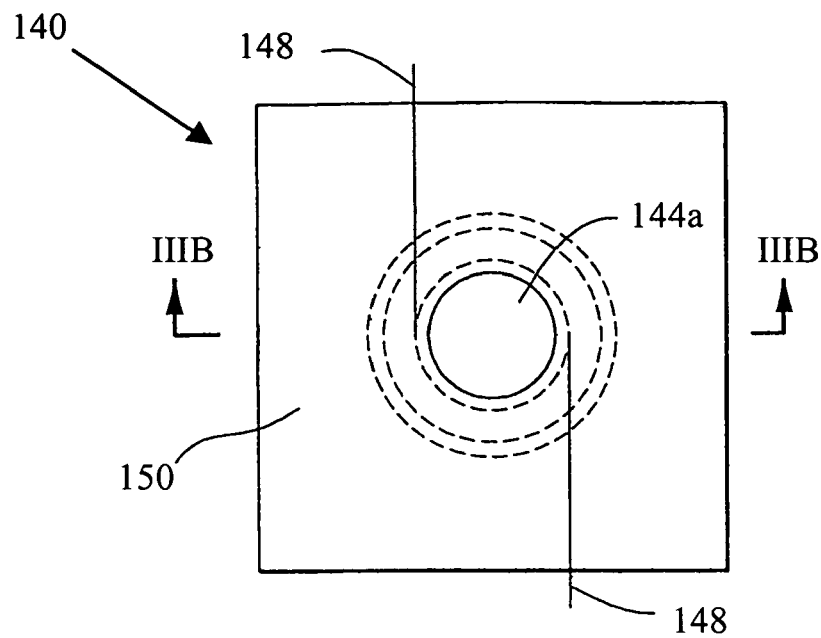
FIG. 3A is a front elevation view of a first embodiment of a high flow rate electrokinetic pump usable with the present invention.
Figure 3B:
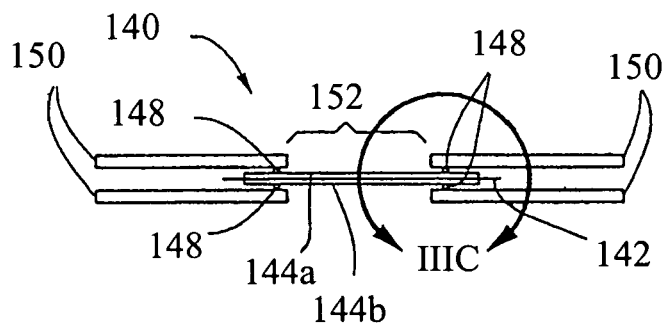
FIG. 3B is a top cross-sectional view of the pump of FIG. 3A along line IIIB-IIIB.
Figure 3C:
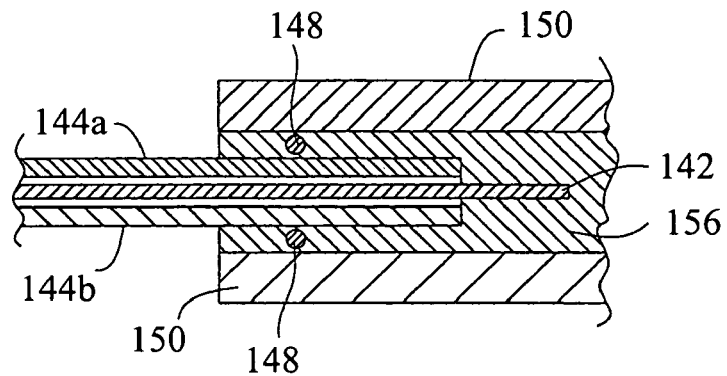
FIG. 3C illustrates an enlarged detail view of the pump of FIG. 3A in region IIIC identified in FIG. 3B.

FIGS. 3A, 3B, and 3C show an electrokinetic pump 140 usable with the present invention. This electrokinetic pump is usable, for example, as the electrokinetic fuel pump 104 in the first embodiment of the fuel cell system described above, or the electrokinetic fuel pump 122 in the second embodiment of the fuel cell system described above.

With reference to FIGS. 3A, 3B and 3C, a pump 140 according to the present invention has a porous dielectric material 142 sandwiched between two capacitive electrodes 144a and 144b having a voltage drop therebetween. The electrodes 144a and 144b preferably directly contact the porous dielectric material 142 so that the voltage drop across the porous dielectric material preferably is at least 10% of the voltage drop between the electrodes, more preferably at least 50% of the voltage drop between the electrodes, and most preferably at least 85% of the voltage drop between the electrodes. This configuration maximizes the potential across the pump material 142 so that a lower total applied voltage is required for a given flow rate. It is advantageous for the pump 140 to have a low drive voltage so that it is suitable for integration into compact systems or for close coupling to sensitive electronic devices. Further, sandwich structures with the electrodes 144a and 144b in intimate contact with the porous dielectric material 142 prevent the flexure of the porous dielectric material when the pump 140 is configured to pump through the face of the porous dielectric material. Pump flexure reduces the amount of pump fluid pumped in a cycle.

Preferably electrical leads 148 are placed in contact with outside surfaces of the electrodes 144a and 144b. The porous dielectric material 142, electrodes 144a and 144b and the leads 148 can be sandwiched between supports 150, each having a hole 152 so that the pump fluid can flow through the porous dielectric material 142 and the electrodes 144a and 144b. The supports 150 help to maintain the planarity of the pump 140. Maintaining the planarity of the pump 140 helps to maintain a uniform current flux on the electrodes 144a and 144b.

The pump 140 is preferably laminated using a bonding material 156 so that the pump and its lamination forms an integrated assembly that can be in the form of a chip-like assembly as described in U.S. Pat. No. 7,364,647, entitled Laminated Flow Device invented by Phillip H. Paul, David W. Neyer, and Jason E. Rehm, filed on Jul. 17, 2002, and incorporated herein by reference. Alternatively, the pump 140 can be placed on an etched chip, for example, or incorporated into a flow system by any other means known in the art.

The length of time for which the pump is capable of pumping in one direction is limited by the physical properties of the electrodes, which are porous carbon materials that act as supercapacitors in operation. Therefore, the electrodes should be sized to dispense the volume of fluid that will be carried in the reservoir. The size of this electrode is determined by dividing the integrated current required to dispense the volume (product of the dispensed volume and the current per unit volume) by the amount of charge that the electrode can hold per unit volume before inducing electrochemical degradation of the fuel.

Preferably, fuel cell systems according to the present invention employee electrokinetic pumps operating in an oscillatory mode. In this mode of operation, a voltage is applied to the pump, moving the fluid in one direction for a period of time determined by the capacitance of the electrodes, the fluid being drawn through the pump by the potential that is established at the surface of the electrodes. Ions are drawn from a double layer in the electrode to support the current draw until the potential at the electrode exceeds the potential necessary to drive Faradaic processes. Preferably, the potential across the pump is reversed prior to the point at which this potential is exceeded to avoid unwanted electrochemical conversion through Faradaic processes. Generally, the pump generates electroosmotic flow through the pump by sloshing the ions back and forth between the electrodes as the potential is switched. The switching of the potential can take the form of a square wave, a smoothing varying wave, a saw tooth wave form, etc. Preferably, in order to maintain a uniform flow of fuel, the form is a square wave.

Figure 4:
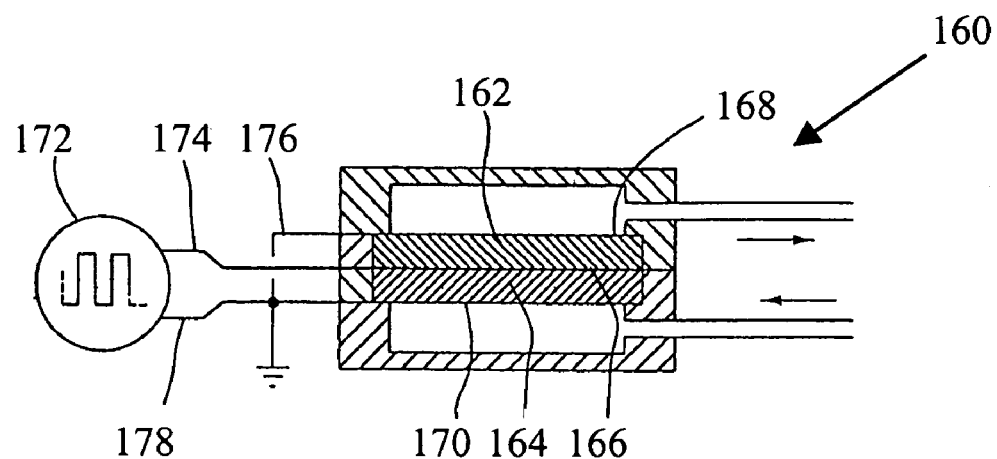
FIG. 4 is a schematic diagram of an electrokinetic pump usable with the present invention.

FIG. 4 is a schematic diagram of an electrokinetic pump 160 that can be used in an oscillating mode in the present invention. The electrokinetic pump of FIG. 4 can be used, for example, as the electrokinetic mixing pump 134 in the second embodiment described above. As shown in FIG. 4, the pump 160, contains a porous dielectric material 162 having a positive zeta potential and a porous dielectric material 164 having a negative zeta potential. Three electrodes are used in pump. An inner electrode 166 is located between the two porous dielectric materials 162, 164 adjacent to an inside face of each porous dielectric material. Two outer electrodes 168, 170 are located on or adjacent to an outside face of each of the porous dielectric materials. Electrodes 166, 168 and 170 are connected to an external power supply 172 via leads 174, 176 and 178, respectively. In this embodiment, the electrodes 168 and 170 preferably are held at ground and the driving voltage from power supply 172 is applied to the center electrode 166.

It is also possible to have multi-element pumps having a plurality of sheets of porous dielectric materials and a plurality of electrodes, one electrode being located between every two adjacent sheets. The value of the zeta potential of each sheet of porous dielectric material has a sign opposite to that of any adjacent sheet of porous dielectric material. Two or more pumps can be connected in parallel for increased flow rates, or in series for increased pressures, e.g. as described in U.S. Pat. No. 6,719,535, by Rakestraw et al., the entire contents of which are hereby incorporated by reference herein.

Figure 5:
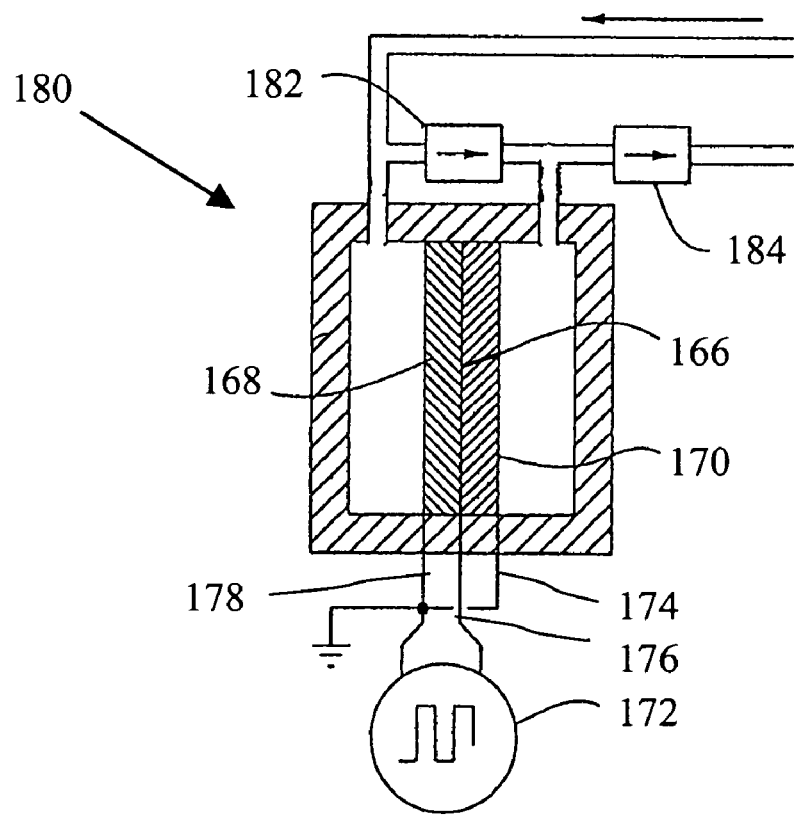
FIG. 5 is a schematic diagram of an electrokinetic pump with two check valves usable with the present invention.

FIG. 5 is a schematic diagram of an electrokinetic pump 180 of the same type as the electrokinetic pump 160, but having two check valves 182, 184 usable with the present invention. When a negative voltage is applied to the inner electrode 166 of the pump 180, the junction of the two check valves is pressurized, the first check valve 182 is closed and the second check valve 184 is opened, and liquid flows out from the pump 180. When a positive voltage is applied to the middle electrode 166, check valve 184 is closed, preventing liquid flow toward the fuel cell, and check valve 182 is opened, allowing flow around the pump 180. The second half of the pump cycle, when a positive voltage is applied to the second electrode 166, can be used for electrode regeneration if the charge per half-cycle is balanced.

Figure 6:
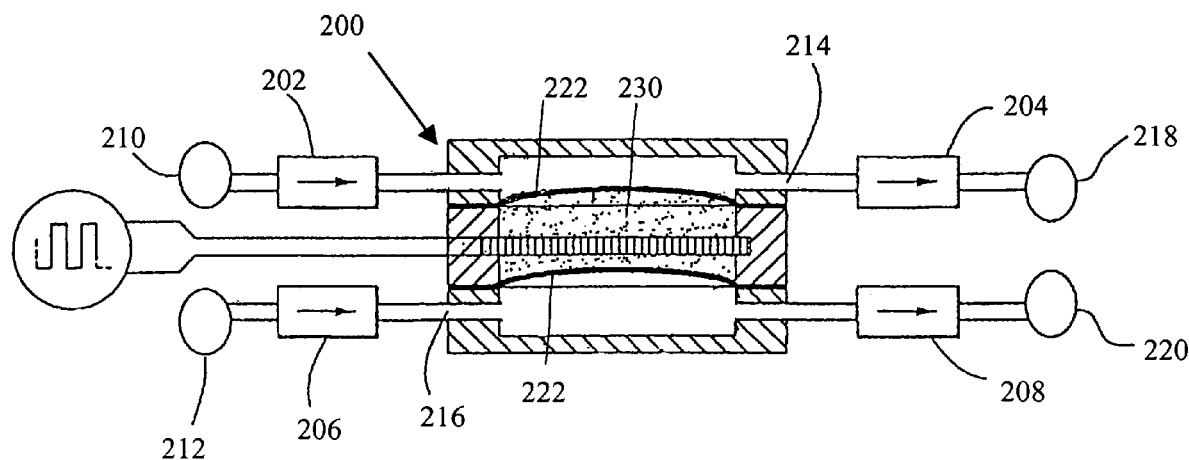
FIG. 6 is a schematic diagram of an electrokinetic pump with four check valve usable with the present invention.

FIG. 6 is a schematic diagram of an electrokinetic pump 200 having four check valves 202, 204, 206, 208 usable with the present invention in an oscillating mode. Configurations with four check valves give unidirectional flow and utilize the pump on both halves of the pump cycle. The pump 200 has two separate inlets 210, 212. There are two separate flow paths 214 and 216 within the pump 200 leading to two separate outlets 218, 220. The pump illustrated in FIG. 6 is an indirect pump, having a flexible impermeable barrier 222 physically separating the fluid 230 in the pump 200 from a fluid in the first flow path 214 and from a fluid in a second external fluid flow path 216. When the fluid in the pump 200 is pumped, the fluid causes the flexible barrier 222 to flex and pump the fluid in the first and second flow paths 214, 216.

In the first half of the pump cycle, fluid is pumped through fluid inlet 210 and the check valve 202 of the first flow path 214, while fluid is pumped through check valve 208 and out of fluid outlet 220 of the second flow path 216. In the next half of the pump cycle, fluid is pumped in through fluid inlet 212 and check valve 206 of the second external flow path 216, while fluid is pumped though the check valve 208 and out of fluid outlet 218 of the first flow path 214. The external fluids can be the same or different fluids. The flow paths 214, 216 can be combined before the check valves 202 and 206 or after the check valves 204 and 208 or both. This allows the pump to use an electrolyte and electrodes that can have deleterious effects on the fuel or the membrane-electrode assembly, because the electrolyte and the electrodes are never in contact with the fuel or the membrane-electrode assembly.

Electrokinetic pumps can utilize capacitive electrodes. The capacitive electrodes can be made from a variety of different materials. Metal oxides, such as ruthenium oxide or metal halides such as silver chloride, act as a pseudo-capacitive system in which the electrochemistry at the electrodes reversibly converts electrode material into ionic species that can carry current. However, these electrodes are not acceptable for use in electrokinetic pump-driven fuel delivery designs where the pump contacts fuel that contacts the membrane-electrode assembly because of the detrimental effects of the metal ions on the catalyst. However, these electrodes can be used in indirect pump designs where the electrodes do not directly contact the fuel.

Another type of capacitive electrode is a porous carbon electrode. This electrode material can store ions in a double layer at the electrode-electrolyte interface. As a result of the high surface areas for this material, the carbon electrode can store on the order of 100Farads of charge per gram of material.

In many cases, the operation of electrokinetic pumps leads to electrochemistry at the fuel-electrode interface. The electrochemical products that result must be compatible with the fuel cell assembly. Preferably, the products, whether in a gaseous or liquid state, are chemicals that can be consumed by the cell membrane-electrode assembly as fuel. For fuel cells, the production of gaseous products in the fuel cell chamber is not a significant issue, as it can be in other applications, provided that the gaseous products are not catalyst poisons. Because the membrane-electrode assembly produces gas, the system, including the pumps, must be designed to handle the gaseous products.

The fuel mixture cannot poison the catalyst in the fuel cell assembly. Thus, any chemical added to the fuel to enhance the electroosmotic flow of the fuel mixture through an electrokinetic pump must be carefully selected. Generally, it is preferable to avoid addition of any chemicals that dissolve to form metal ions (positively charged). It is generally believed that the addition of negatively charged ions is acceptable.

Additives that enable the operation of the system include formic acid and carbonic acid. Formic acid and carbonic acid are also found in the fuel cell mixture once the system is operating. Formic acid is an intermediate in the catalytic oxidation of methanol, a process that occurs at the membrane-electrode assembly of a direct methanol fuel cell and the methanol reformer. Any formic acid formed at an electrokinetic pump electrode is consumed upon delivery to the membrane-electrode assembly. Carbonic acid is formed when the carbon dioxide, also generated at the membrane-electrode assembly, dissolves in water. The addition of carbonic acid to the fuel stream beforehand as a means of enhancing electroosmotic flow or by electrochemical processes occurring at the electrokinetic pump electrodes leads to more rapid gas generation at the membrane-electrode assembly. This should not pose a problem for the fuel cell.

A preferred double layer capacitive material for the electrode is carbon having a very large ratio of microscopic surface area to geometric surface area. A monolithic carbon aerogel with a bimodal pore distribution is preferred. It is desirable that the larger pores are suitable for flow through operation and that the smaller pores are in the nanoporous regime such that the material has very high capacitance. Another form that is usable is carbon paper impregnated with carbon aerogel. Other carbon materials that can be used include carbon aerogel, e.g., monolithic carbon aerogel foam, woven carbon cloth, carbon fibers (e.g., pyrolized polyacrylonitrile fibers and pyrolized cellulose fibers), carbon nonotubes, carbon black, a polymer having carbon particles dispersed therein, and frits of carbon particles. It is also possible to use other conductive materials having a high microscopic surface area, for example, sintered metals, nanoporous metals, such as nanoporous gold, perforated plates, porous frits, porous membranes, deLevi brushes, and metals that have been treated to increase their surface area, for example by surfacing roughening, surface etching or platinization.

The electrokinetic pump elements are generally referred to as porous dielectric materials. Suitable dielectric materials are known to those skilled in the art, and can be organic, such as a porous polymer membrane or a phase-separated material. Suitable dielectric materials can also be inorganic, such as a porous sintered ceramic, a porous inorganic oxide, such as silica, alumina or titania, membrane or aerogel, packed silica beads, micromachined, stamped, or embossed arrays, phase-separated porous glasses such as Vycor, and phase-separated ceramics.

Preferably, the pores in the porous dielectric materials have a diameter of about 50 to about 500 nanometers, so that the conduit has a high stall pressure, but does not have substantial double-layer overlay. Other preferred features for the porous dielectric materials are a high zeta potential and a narrow pore size distribution. Particular examples of porous dielectric materials are the high purity alumina membrane sold under the tradename Anopore, and porous polyvinylidene fluoride membranes, for example those sold under the name Durapore, which can have a pore size of about 100 to about 200 nanometers, and which can be modified to be hydrophilic and have a zeta potential of about −30 to about −60 millivolts.

The pumps described herein can be manufactured by a number of means. The simplest pumps can be manufactured by stacking the various elements together in an appropriate order and clamping them. Alternatively, lamination methods such as those disclosed in U.S. patent application Ser. No. 10/198,223, U.S. Patent Publication 2004-0011648, and PCT Application PCT/US03/22306, the entire contents of which are incorporated herein by reference, can be used.

Figure 7:
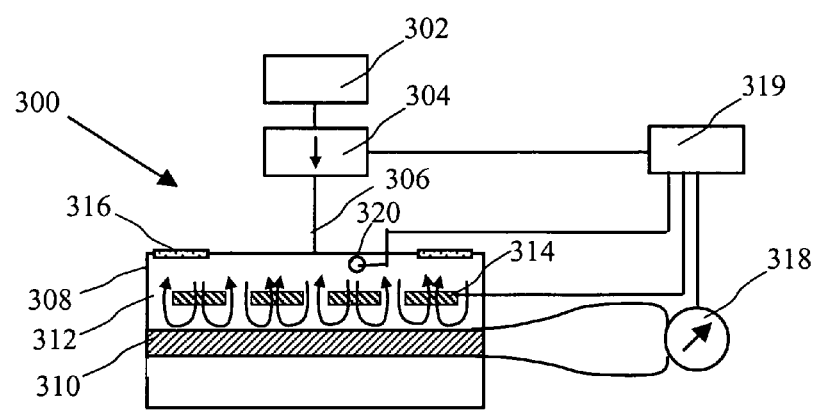
FIG. 7 is a schematic diagram of a fuel cell system according to a third embodiment of the present invention employing a plurality of stirring pumps.

FIG. 7 is a schematic diagram of a fuel cell system 300 according to a third embodiment of the present invention. As shown in FIG. 7, a fuel stored in a fuel reservoir 302 is pumped by an electrokinetic fuel pump 304, through a delivery conduit 306 to a fuel cell 308. The fuel cell 308 includes a membrane-electrode assembly 310 and a reservoir 312. One or more electrokinetic stirring pumps 314 operating in an oscillatory mode are positioned in the reservoir 312 to stir the fuel mixture inside the reservoir. The fuel cell 308 also has at least one permeable membrane 316 allowing any gas generated as a by-product of the fuel to electricity conversion to escape.

The delivery conduit 306 can be a single conduit or a conduit that is subdivided into a delivery manifold to allow for a uniform distribution across the area of the fuel cell assembly 308 depending upon the physical size of the fuel cell required. The fuel is delivered at a rate suitable for the power demands based upon the energy available from the fuel and the conversion efficiency of the system. For example, using methanol as a fuel, the energy available is −698.2 kJ/mol. A typical overall efficiency of a direct methanol fuel cell system is 22%. Typically, therefore, one can expect 1 $W*h/cm^3$ of methanol from a direct methanol fuel cell system.

Optionally, the fuel cell system has a current monitor 318 that detects the current produced by the fuel cell. The current monitor 318 can be used to provide feedback to a controller 319 for control of the flow rate of the first electrokinetic pump 304. Additionally, one or more fuel concentration monitors 320 can be located inside the reservoir 312. The concentration monitors 320 can be used to provide feedback to the controller 319 for control of the flow rate of the electrokinetic stirring pumps 314.

The current monitor 318 and the concentration monitor 320 can be used together to measure both the flow rate of the fuel into the reservoir 312 and the degree of mixing. These signals can be used as feedback to the controller 319 for controlling the electrokinetic fuel pump 304 and the electrokinetic stirring pumps 314 to provide optimal fuel mixtures near the membrane-electrode assembly. In operation, as fuel is consumed or delivered at a higher rate, a large concentration gradient is formed across the reservoir 312 and more mixing is desirable. The multiple monitor feedback loop addresses this need.

Figure 8A:
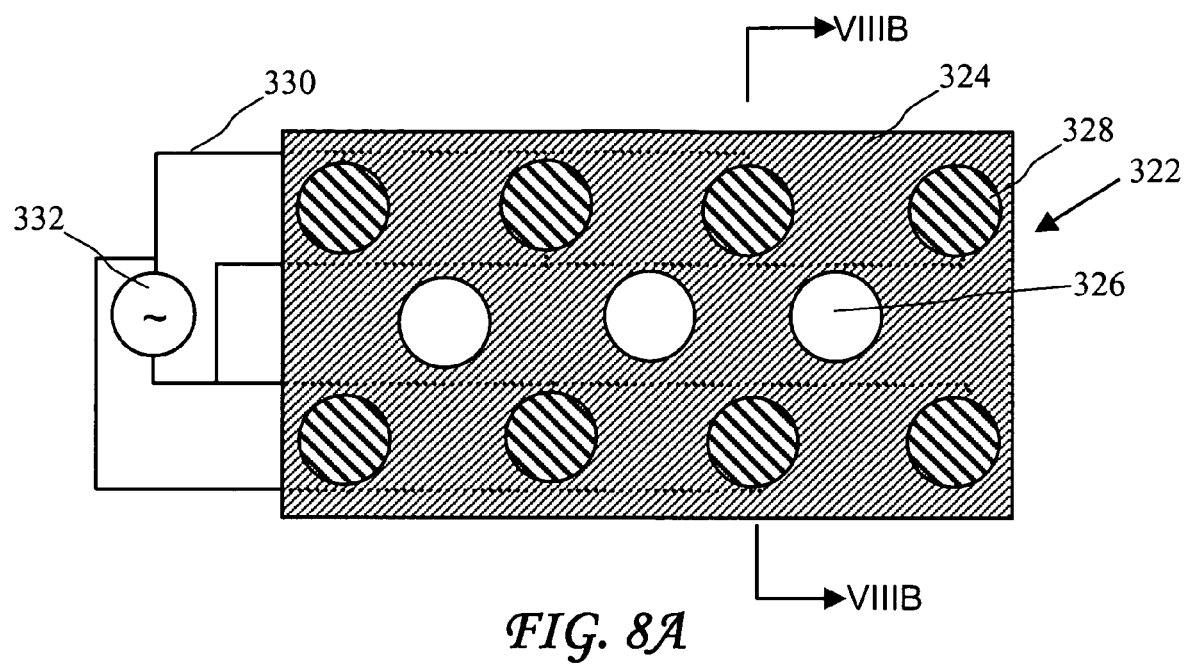
FIG. 8A is a top view of a first embodiment of electrokinetic stirring pumps usable in connection with the present invention.
Figure 8B:
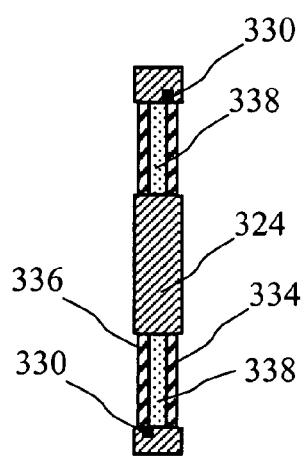
FIG. 8B is a sectional view through FIG. 8A along line VIIIB-VIIIB.

FIGS. 8A and 8B show an electrokinetic stirring pump assembly 322 usable with the present invention. The electrokinetic stirring pump assembly 322 comprises a support material 324 with openings 326 for liquid circulation and gas removal. The pump assembly 322 comprises a plurality of pumps 328. A plurality of electrical leads 330 connects an AC power source 332 to the electrodes 334, 336 of the pumps 328 so that the pumps can be operated in an oscillatory mode. Pump elements 338 are sandwiched between the electrodes.

The pumps 328 can be connected as shown so that alternating pumps are operated out of phase. The electrical leads 328 can be assembled in the support material 324 by appropriate means to avoid any contact with the fuel. In operation, the fuel is alternately sloshed in opposite directions by simultaneously switching the polarity of the potential applied to all of the stirring pumps 328 in the pump assembly 322. Alternatively, all of the pumps 328 can be operated synchronously (i.e., in-phase) to reduce the number of leads required. The area dedicated to the pumps can be approximately equal to the area dedicated to the openings in the pump assembly.

The electrokinetic stirring pumps 328 are built into the reservoir such that liquid can pass between the pumps with little resistance through the openings 326 in the electrokinetic pump assembly 322. In order to maintain a consistent flow of fluid in the direction toward the pump, it is desirable that half of the pumps 328 should be pumping in each direction at any time. As shown in FIG. 7, the pumps 328 move the fluid from a delivery side of the reservoir 312 to the membrane-electrode assembly side of the reservoir and vice versa. The net effect is simply a low resistance mass transport. This reduces the pressure-generation requirements of the pumps significantly, which in turn has additional benefits. The electrokinetic stirring pumps can use much larger average pore sizes relative to the design for an electrokinetic fuel pump. Since pumps with larger pores can operate with much lower electrolyte concentrations, the operating current is reduced. This also allows for operation at lower voltages.

The openings 326 also provide a path for the removal of any gas generated at a membrane-electrode assembly anode during oxidation of the fuel. For example, during the oxidation of methanol with the anode of a direct methanol fuel cell, for each molecule of methanol that is consumed, a molecule of carbon dioxide is generated and must be removed from the reservoir, typically in gaseous form after a bubble is generated. When the electrokinetic stirring pumps are operated in a reciprocating mode, the flow pattern serves two purposes. First, the flow carries gas bubbles through the openings in the electrokinetic pump mounting layer so that the gas can be released through the gas permeable membranes 316. Second, the position of the electrokinetic stirring pumps inside the reservoir 312 in relatively close proximity to the membrane-electrode assembly 314 and in a manner that provides a sweeping flow across the membrane-electrode assembly, assists in the removal of gas from the membrane-electrode assembly surface as it is formed. Removal of the gas from the membrane-electrode assembly exposes the membrane-electrode assembly surface thereby increasing the performance of the system over existing fuel cell assemblies.

Preferably, the diameter of each pump 328 is larger than the distance between the pump and the membrane-electrode assembly. Also preferably, the distance between the pumps and the plane of the fuel entrance is less than about three times the diameter of the pump, more preferably two times the diameter of the pump, and even more preferably, about the diameter of the pump. More effective mixing of the fuel is obtained by using a manifold that distributes the fuel to the various electrokinetic stirring pumps.

Figure 9A:
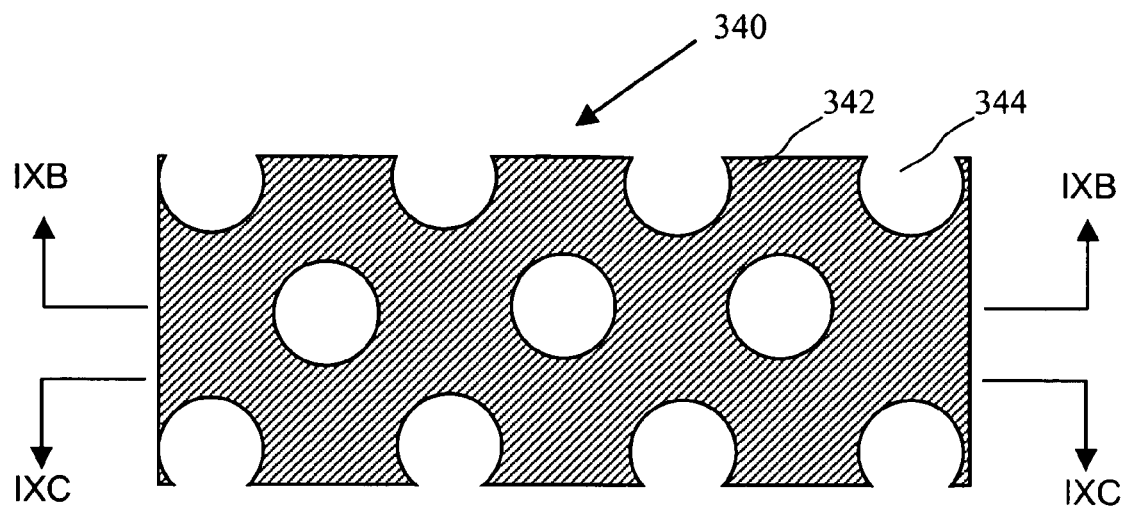
FIG. 9A is a top view of a second embodiment of electrokinetic stirring pumps usable in connection with the present invention.
Figure 9B:
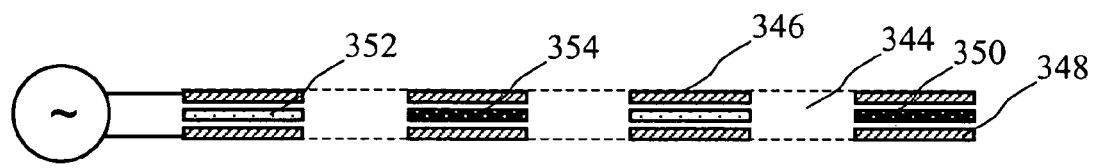
FIG. 9B is a cross-sectional view of the electrokinetic stirring pump of FIG. 9A along line IXB-IXB.
Figure 9C:
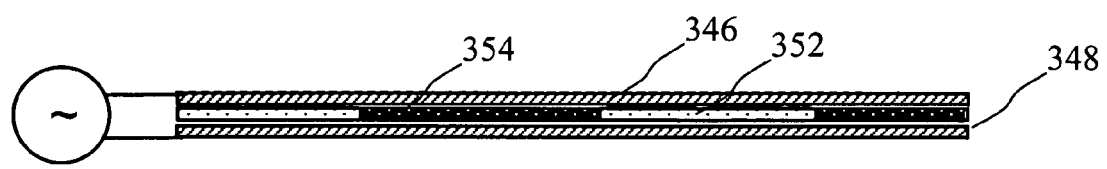
FIG. 9C is a cross-sectional view of the electrokinetic stirring pump of FIG. 9A along line IXC-IXC.

FIGS. 9A, 9B, and 9C show a second embodiment of an electrokinetic stirring pump assembly 340 usable with the present invention. The electrokinetic stirring pump assembly 340 does not use dedicated separate electrical connections to each pump. Additionally, the electrokinetic stirring pump assembly 340 does not require support material between the pumps. As shown in FIGS. 9A, 9B, and 9C, a porous electrode material 342 contains openings 344 allowing for liquid circulation and gas removal. Two electrode layers 346 and 348 sandwich a pump layer 350. The two electrode layers 346, 348 are made of high surface area porous carbon electrode materials. The pump layer 350 comprises two oppositely charged types of pumping materials 352, 354 arranged in an alternating fashion as shown in FIGS. 9B and 9C.

The assembly of the pumps can be accomplished by lamination. The lamination area should be the minimum amount required to give the structure acceptable mechanical integrity, allowing the remaining area to act as a pump. One method for forming the holes for gas removal is punching them after the layers are laminated, although it is possible to make the wholes prior to assembly of the layers. In the design shown, when a positive potential is applied between the electrodes, half of the pump moves fluid toward the membrane-electrode assembly and half of the pump moves fluid away from the membrane-electrode assembly. The flow direction changes in both pumping regions as the applied potential is reversed.

Figure 10:
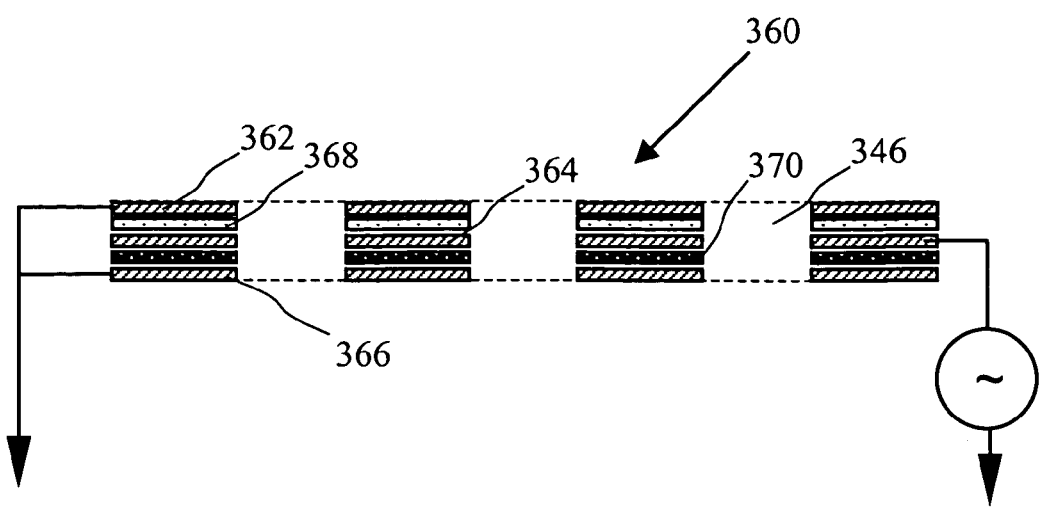
FIG. 10 is a cross-sectional view of an electrokinetic stirring pump assembly usable with the present invention employing three electrode layers.

FIG. 10 shows a cross-sectional view of a third embodiment of an electrokinetic stirring pump assembly 360 usable with the present invention. As shown in FIG. 10, the pump assembly 360 has three electrode layers 362, 364, 366. Optionally, the electrode layers are made of high surface area porous carbon electrode materials. A first pump material layer 368 is sandwiched between two of the three electrode layers 362, 364. A second oppositely charged pump material layer 370 is sandwiched between two of three electrode layers 364, 366. The outer electrodes 362, 366 can be held at a potential chosen based upon the fuel cell configuration, while the middle electrode 364 can be varied as required for electrokinetic pump operation.

The electrokinetic pump with supporting power supply and the membrane-electrode assembly with electrical load each represent a current-carrying circuit. These circuits can be in electrical communication when elements of these circuits are in liquid communication. It will be appreciated that, under such conditions, stray current can be drawn between these circuits. Stray current can result in a loss of electrical power and hence reduce the efficiency of the fuel cell. Stray current can also result in overcharging of a capacitive electrode leading to gas generation and degradation of the liquid.

The embodiment shown in FIG. 10 and variations thereon allow for a relaxed set of design conditions for placement of the pump relative to the membrane-electrode assembly such that there is reduced or no parasitic current flow from the pump assembly to the membrane-electrode assembly. One option to guard against parasitic current flow is to set the potential of the outer electrodes 362, 366 to the potential of the anode in the fuel cell assembly. Alternatively, one can avoid such stray current by electrically isolating the electrokinetic pump and the membrane-electrode assembly circuits.

Methods of isolating electrical circuits are well known in the arts of electrical engineering. For example, one approach is to power the electrokinetic pump from a battery, making no electrical connection other than connection through the liquid between the electrokinetic pump circuit (including power supply and supporting circuit electronics) and the membrane-electrode assembly circuit. Alternatively, one can power the electrokinetic pump with an isolated power supply (for example, a capacitatively or inductively coupled power supply or voltage converter), making no electrical connection other than connection through the liquid between the electrokinetic pump circuit (including power supply and supporting control electronics) and the membrane-electrode assembly circuit.

Control and data transfer to/from an isolated electrokinetic pump controller can be accomplished using well established means, including, but not limited to, radio frequency, capacitive, inductive, or optical data links. Because the membrane-electrode assembly is intended for power generation and because the electrokinetic pump tends to draw little power, it is preferable, but not necessary to isolate (or 'float') the electrokinetic pump circuit from the membrane-electrode assembly circuit and from the membrane-electrode assembly load.

Figure 11:
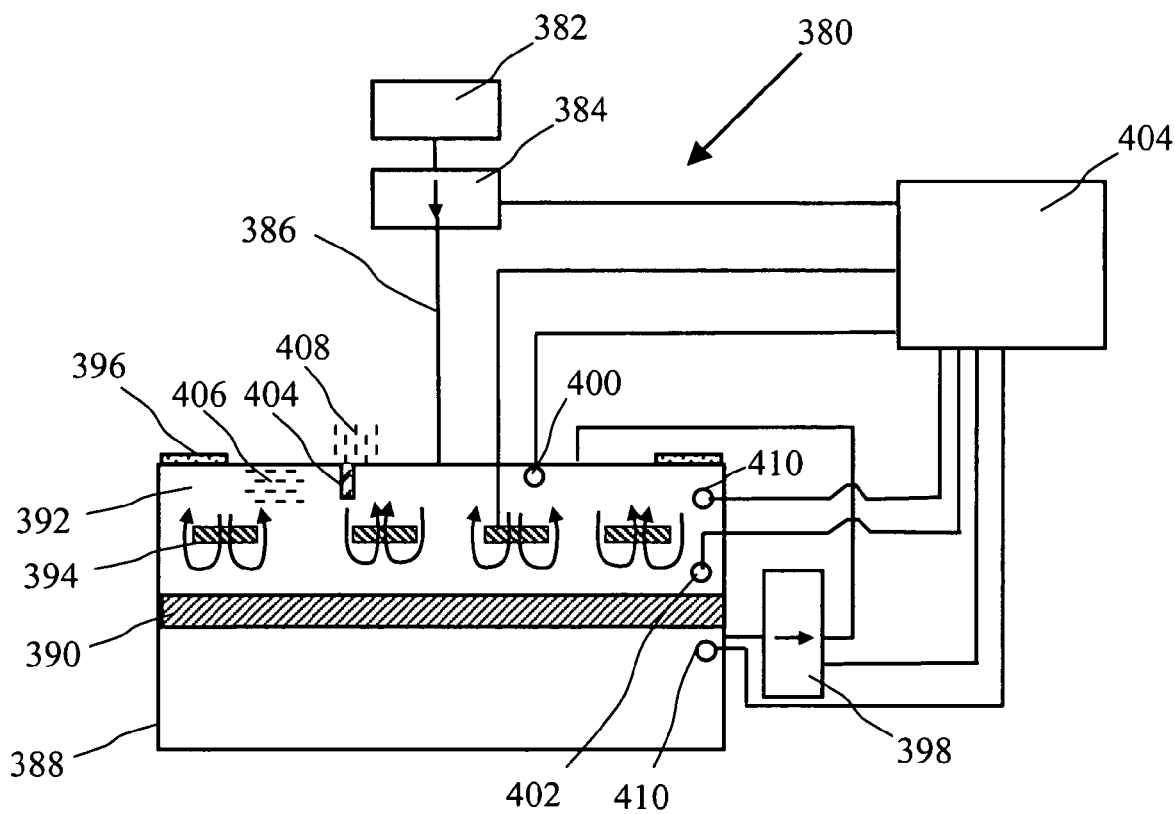
FIG. 11 is a schematic diagram of a fuel cell system according to a fourth embodiment of the present invention containing an electrokinetic recirculation pump for moving water from the cathode to the anode.

FIG. 11 shows a fuel cell system 380 according to a fourth embodiment of the present invention. Fuel stored in a fuel reservoir 382 is pumped by an electrokinetic fuel pump 384, through a delivery conduit 386 to a fuel cell 388. The fuel cell 388 includes a membrane-electrode assembly 390 and a reservoir 392. One or more electrokinetic stirring pumps 394 operating in an oscillatory mode are positioned in the reservoir 392 to stir the fuel mixture inside the reservoir. The fuel cell has at least one permeable membrane 396 allowing any gas generated as a by-product of the fuel to electricity conversion to escape.

As shown in FIG. 11 a recirculation electrokinetic pump 398 moves reaction products, such as water, from one side of the membrane-electrode assembly to the other. Optionally, the fuel cell system may include a condensation region to convert gaseous products to liquids that can be pumped by the electrokinetic recirculation pump 398. Optionally, in a feedback mode of operation, the flow rate for the recirculation pump is based upon the current generated by the fuel cell taking into account the efficiency of the system. Alternatively, the signal from a fuel concentration monitor 400, such as a methanol concentration monitor, in conjunction with a fluid level sensor 402 can be used by a processor 404 to determine the amount of water needed. The processor can adjust the flow rate of the recirculation pump 398 accordingly.

By the nature of its operation, the stirring pumps not only mix fuel in the reservoir, but serve to transport heat away from the membrane-electrode assembly 390. In fuel cells where excess heat is generated by the membrane-electrode assembly, the heat often needs to be carried away from the fuel cell. In order to accomplish this, heat transferring elements can be added to the system, the additional elements having substantially higher thermal conductivity than the fuel mixture. The heat transferring elements assist in the transfer of heat from the fuel to the outside of the fuel cell.

As shown in FIG. 11, a post 404 and/or fins 406 can be added to the inside of the fuel cell reservoir 392 as heat transferring elements. It is preferable that the heat transferring elements chosen, such as fins, be oriented in a manner that does not impede the mixing of fuel coming into the reservoir 392. Preferably, the heat transferring elements chosen establish patterns that enhance fuel mixing. The heat transferring elements must be compatible with the fuel cell components. For example, one might select alumina which has a thermal conductivity significantly higher than that of a water/fuel mixture. Additional components such as fins 408 can be added to the outside of the fuel cell. Optionally, a temperature sensor 410 can be placed in the reservoir 392 to be used in conjunction with the fuel concentration monitor 400 to allow both temperature and fuel concentration to be used by the controller in determining flow rates for the electrokinetic fuel pump 384, and the stirring pumps 394.

Figure 12A:
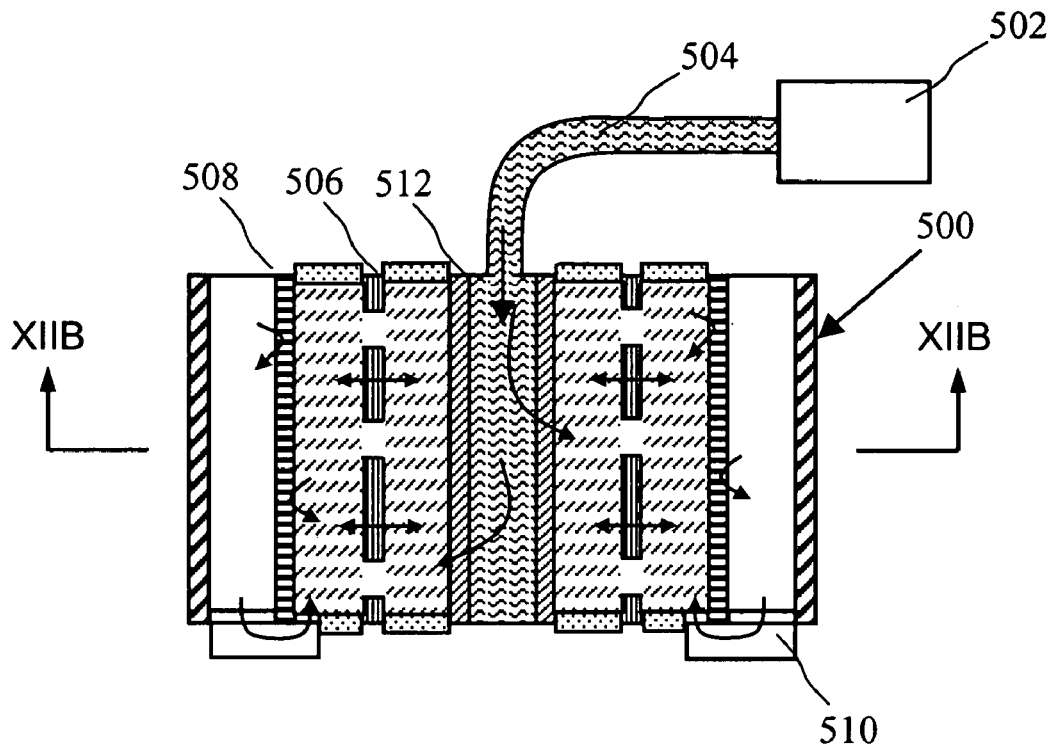
FIG. 12A is a schematic diagram of a fuel cell system according to a fifth embodiment of the present invention whereby the fuel cell system is formed as a cylinder.
Figure 12B:
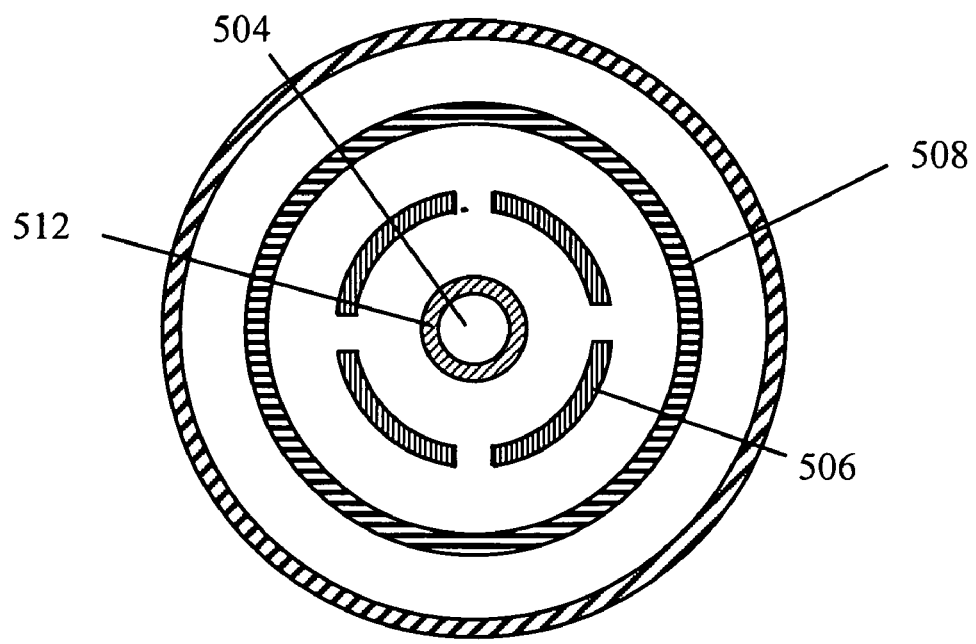
FIG. 12B is a cross-sectional view of the fuel cell system of FIG. 12A taken along line XIIB-XIIB.

By their nature, electrokinetic pumps can be manufactured in many different shapes and sizes. Therefore, an electrokinetic pump can be integrated into a fuel cell cartridge so that the electrokinetic pump is replaced with the fuel cell cartridge. FIGS. 12A and 12B show a fuel cell assembly 500 according to a fifth embodiment of the present intention. As shown in FIG. 12A, the fuel cell assembly 500 is shaped as a cylinder. An electrokinetic fuel pump 502 pumps fuel through a conduit 504 through a center of the assembly 500. Stirring pumps 506 and a membrane-electrode assembly 508 are both rolled together in the assembly 500. Additionally, a recirculation pump 510 moves reaction products from one side of the membrane-electrode assembly 508 to the other side of the membrane-electrode assembly.

With the cylindrical design shown in FIGS. 12A and 12B, it is desirable to insure that the fuel is distributed along the length of the cylinder. The electrokinetic fuel pump can be placed in the center of the pump assembly and pump fluid along its length into the mixing reservoir. Alternatively, the electrokinetic pump can be located outside of the cylinder and the fuel distributed using a distribution tube 512. The distribution tube 512 can be a tube with occasional openings, such as a perforated tube or a porous membrane material.

Optionally, the orientation of the fuel cell system shown in FIGS. 12A and 12B is reversed, with the fuel being pumped through a distribution tube located outside of the fuel cell. Optionally, the pump can be folded onto itself rather than rolled to produce a more compact device.

Figure 13:
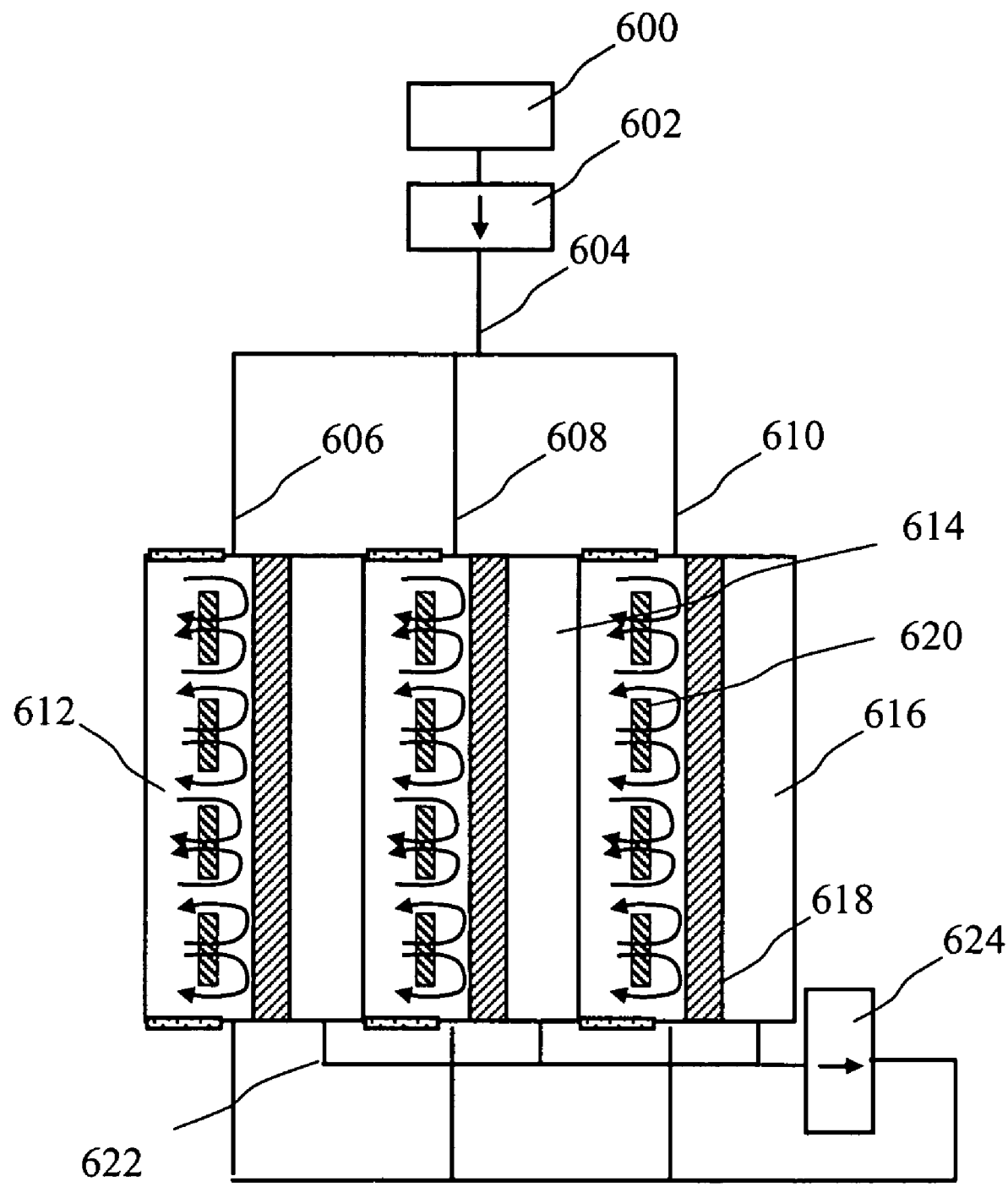
FIG. 13 is a schematic diagram of a fuel cell system having a plurality of fuel cells in series.

Optionally, as shown in FIG. 13, a plurality of fuel cells can be used in series to produce a voltage that is the sum of the voltages produced by the individual fuel cells. A single fuel reservoir 600 can be coupled to a single electrokinetic fuel pump 602. The electrokinetic fuel pump 602 pumps the fuel through a conduit 604. The conduit 604 splits into three branches 606, 608, 610 and delivers fuel to three separate fuel cells 612, 614, 616. Each fuel cell has a separate membrane-electrode assembly 618 and a separate electrokinetic stirring pump assembly 620. The reaction products from all three fuel cells 612, 614, 616 are collected from a first side of each membrane-electrode assembly 618 in a single conduit 622 and pumped by a single recirculation pump 624 back to the other side of each of the membrane-electrode assemblies 618.

For improved performance of the overall system and to allow for surges in the power demand, an energy storage device can be incorporated. Suitable energy storage devices include capacitors, super capacitors, and rechargeable batteries. Although not illustrated, this approach is known in the art as a means to provide smooth power as required. See, for example, Jarvis, Atwater and Cygan, J. Power Sources 79, pp. 60-63 (1999), the entire contents of which are hereby incorporated herein by reference.

One skilled in the art will recognize that the electrokinetic fuel pumps described herein are usable in fuel cell systems utilizing fuel cells with many different conversion mechanisms. Therefore, the term "membrane-electrode assembly" is understood to include other fuel cell conversion mechanisms known by those skilled in the art. Additionally, the electrokinetic stirring pumps described herein may be used in fuel cell systems utilizing a prior art pump, such as a piezoelectric pump, as a fuel delivery system. Additionally, the electrokinetic fuel pump described herein may be used in fuel cell systems employing prior art pumps as stirring pumps.

Although the present invention has been described in considerable detail with reference to certain preferred versions thereof, other versions are possible. Therefore, the spirit and scope of the appended claims should not be limited to the description of the preferred versions described herein.

All features disclosed in the specification, including the claims, abstract and drawings, and all the steps in any method or process disclosed, can be combined in any combination except combinations where at least some of such features and/or steps are mutually exclusive. Each feature disclosed in the specification, including the claims, abstract, and drawings can be replaced by alternative features serving the same, equivalent or similar purpose, unless expressly stated otherwise. Thus, unless expressly stated otherwise, each feature disclosed is a one example only of a generic series of equivalent or similar features.

Any element in a claim that does not explicitly state "means" for performing a specified function or "step" for performing a specified function, should not be interpreted as a "means" or "step" clause as specified in 35 U.S.C. § 112. As used herein, the term "coupled" means operatively connected to and does not require "coupled" objects are in direct physical contact with each other.

What is claimed is:

1. A fuel cell system comprising:
   a) a fuel cell comprising a membrane-electrode assembly;
   b) a fuel reservoir containing a liquid fuel;
   c) a conduit coupling the fuel reservoir to the fuel cell;
   d) an electrokinetic fuel pump coupled to the conduit, the electrokinetic fuel pump comprising a plurality of electrodes; and
   e) a plurality of electrokinetic stirring pumps positioned inside of the fuel cell for stirring the fuel in the fuel cell wherein the electrokinetic fuel pump moves fuel from the fuel reservoir through the conduit to the fuel cell.

2. The fuel cell system of claim 1 wherein the fuel cell produces a current; and wherein the fuel cell system further comprises:
   a current monitor for monitoring the current produced by the fuel cell;
   a controller coupled to the current monitor, the electrokinetic fuel pump, and to the plurality of electrokinetic stirring pumps;
   wherein the controller controls the flow rate of the electrokinetic fuel pump and the flow rate of the electrokinetic stirring pumps based upon the current detected by the current monitor.

3. The fuel cell system of claim 1 further comprising:
   a temperature sensor for sensing a temperature of the fuel cell;
   a controller coupled to the temperature sensor and to the plurality of electrokinetic stirring pumps;
   wherein the controller controls the flow rate of the plurality of electrokinetic stirring pumps based upon the temperature sensed by the temperature sensor.

4. The fuel cell system of claim 1 further comprising:
   a current monitor for monitoring the current produced by the fuel cell;
   a temperature sensor for sensing the temperature of the fuel cell; and
   a controller coupled to the current monitor, the temperature sensor, the electrokinetic fuel pump, and the plurality of electrokinetic stirring pumps;
   wherein the controller controls the flow rate of at least one of the electrokinetic fuel pump and the plurality of electrokinetic stirring pumps based upon a current sensed by the current monitor and a temperature sensed by the temperature sensor.

5. The fuel cell system of claim 1 wherein the fuel cell further comprises at least one gas permeable membrane.

6. The fuel cell system of claim 1 wherein the fuel cell further comprises
   a membrane-electrode assembly having an anode and a cathode; and
   an electrokinetic recirculation pump for pumping reaction products generated at the cathode to the anode.

7. The fuel cell system of claim 6 further comprising:
   a concentration sensor to detect fuel concentration at the anode; and
   a controller coupled to the concentration sensor and the electrokinetic recirculation pump;
   wherein the controller controls the flow rate of the electrokinetic recirculation pump based on a concentration sensed by the concentration sensor.

8. The fuel cell system of claim 7 further comprising a condenser for condensing reaction products generated at the cathode.

9. The fuel cell system of claim 1 further comprising a plurality of heat conducting posts inside of the fuel cell.

10. The fuel cell system of claim 1 further comprising a plurality of heat conducting fins inside of the fuel cell.

11. The fuel cell system of claim 1 further comprising a plurality of heat conducting fins in thermal contact with an outer surface of the fuel cell.

12. The fuel cell system of claim 1 wherein the fuel cell is formed as a cylinder having a center channel; and wherein the fuel is delivered to the fuel cell along the center channel.

13. The fuel cell system of claim 1 wherein the fuel is delivered to the fuel cell using a fuel distribution manifold.

14. A fuel cell system comprising:
a) a fuel cell having a membrane-electrode assembly and a reservoir;
b) a fuel delivery system providing fuel to the fuel cell; and
c) a plurality of electrokinetic stirring pumps positioned inside of the reservoir for stirring the fuel in the fuel cell.

15. A fuel cell system comprising:
a fuel reservoir for storing a fuel;
a conduit coupling the fuel reservoir to the fuel cell;
an electrokinetic fuel pump coupled to the conduit, the electrokinetic fuel pump comprising a plurality of electrodes; and
a fuel cell, the fuel cell further comprising
    a reservoir; and
    a membrane-electrode assembly having an anode;
        a plurality of electrokinetic stirring pumps positioned inside the fuel cell for stirring the fuel inside the fuel cell, each electrokinetic stirring pump further comprising two outer electrodes and an inner electrode positioned between the two outer electrodes;
    wherein the electrokinetic fuel pump moves fuel from the fuel reservoir through the conduit to the fuel cell.

16. The fuel cell system of claim 15 wherein the electric potential of the outer electrodes of the each of the plurality of electrokinetic stirring pumps is equal to the electric potential of the anode of the membrane-electrode assembly.

17. The fuel cell system of claim 15 wherein the plurality of electrokinetic stirring pumps are powered by a battery.

18. The fuel cell system of claim 15 wherein the plurality of electrokinetic stirring pumps are powered by an isolated power supply.

19. A method for generating electricity comprising:
pumping fuel from a fuel reservoir to a fuel cell with an electrokinetic fuel pump;
passing the fuel through a membrane-electrode assembly in the fuel cell to generate an electric current; and stirring the fuel in the fuel cell with electrokinetic stirring pumps.

20. The method of claim 19 further comprising pumping reaction products generated at a cathode of the membrane-electrode assembly to the anode of the membrane-electrode assembly with an electrokinetic recirculation pump.

* * * * *